US011726007B2

(12) United States Patent
Rajasekharan et al.

(10) Patent No.: US 11,726,007 B2
(45) Date of Patent: Aug. 15, 2023

(54) SYSTEM AND METHOD FOR MONITORING MACHINE OPERATIONS AT A WORKSITE

(71) Applicant: Caterpillar Inc., Peoria, IL (US)

(72) Inventors: Rajakrishnan Palazhi Rajasekharan, Chennai (IN); Sadhana Priya Vashisht, Chennai (IN); John David Parker, Dunlap, IL (US); Rajeshkumar Mathivanan, Chennai (IN); Suthakar Subramani, Chennai (IN)

(73) Assignee: Caterpillar Inc., Peoria, IL (US)

( * ) Notice: Subject to any disclaimer, the term of this patent is extended or adjusted under 35 U.S.C. 154(b) by 314 days.

(21) Appl. No.: 17/033,527

(22) Filed: Sep. 25, 2020

(65) Prior Publication Data

US 2022/0099533 A1 Mar. 31, 2022

(51) Int. Cl.
*G06F 11/30* (2006.01)
*G01M 99/00* (2011.01)
*B60P 1/04* (2006.01)
*G07C 5/04* (2006.01)

(52) U.S. Cl.
CPC ............. *G01M 99/005* (2013.01); *B60P 1/04* (2013.01); *G07C 5/04* (2013.01)

(58) Field of Classification Search
CPC .................................................. G01M 99/005
See application file for complete search history.

(56) References Cited

U.S. PATENT DOCUMENTS

| | | | |
|---|---|---|---|
| 9,709,391 B2 | 7/2017 | Bando | |
| 9,792,739 B2 | 10/2017 | Thomsen | |
| 9,902,397 B2 | 6/2018 | Ohsugi et al. | |
| 10,037,634 B2 | 7/2018 | Christofferson et al. | |
| 10,094,704 B2 | 10/2018 | Tejeda et al. | |
| 10,119,830 B2 | 11/2018 | Sakai et al. | |
| 2006/0243180 A1 | 11/2006 | Sundermeyer | |
| 2010/0198466 A1 * | 8/2010 | Eklund | G05B 15/02 701/50 |
| 2020/0105072 A1 | 4/2020 | Wisley et al. | |

FOREIGN PATENT DOCUMENTS

| | | | |
|---|---|---|---|
| CN | 108305350 A | 7/2018 | |
| CN | 109493449 A | 3/2019 | |
| WO | 2018224551 | 12/2018 | |
| WO | WO-2018224551 A1 * | 12/2018 | B60W 30/04 |

* cited by examiner

*Primary Examiner* — Phuong Huynh

(57) ABSTRACT

A method and system for monitoring operations of a machine operating at a worksite, is provided. The machine includes an implement for performing one or more implement operations and is powered by an engine. The method includes determining a first parameter corresponding to an engine speed associated with the engine, a second parameter indicative of vibrations detected inside the operator cabin and a third parameter indicative of a machine speed associated with the machine. The method further includes determining a machine operation as one of the loading operation, the dumping operation and a travelling operation based on one or more of the determined first parameter, second parameter and the third parameter.

20 Claims, 5 Drawing Sheets

SYSTEM AND METHOD FOR MONITORING MACHINE OPERATIONS AT A WORKSITE

TECHNICAL FIELD

The present disclosure relates, in general, to a machine operating at a worksite. More particularly, the present disclosure relates to a system and method of monitoring machine operations at the worksite.

BACKGROUND

Many work machines may be used to perform a number of operations in repeated manner to accomplish a particular task at a worksite. One example of such machines is a haul truck that performs a number of loading and dumping operations at the worksite, such as a mining site. The haul trucks may repeatedly travel between loading locations and dumping locations for transporting work material from the loading location to the dumping location. A single haul truck may perform several trips daily between the loading and the dumping locations to complete a mining operation. Thus, in order to maintain the overall efficiency of the entire mining operation, it is important to monitor the various operations (i.e., the loading operation, the dumping operation, the travelling operation, and so on) performed by the haul truck.

Typically, such monitoring of operations is done by using a plurality of payload sensors mounted on the haul truck. Such payload sensors may be installed on a dump body of the haul truck to detect loading and dumping operations. However, installation of such payload sensors is troublesome, prone to errors and susceptible to damage. Thus, such payload sensors do not provide an optimum and accurate way of monitoring the operations of the haul truck.

U.S. Pat. No. 9,709,391 provides a position calculating system for a haulage vehicle including wheels and a body frame mounted on the wheels. The system includes an attitude detection sensor fixed on the body frame, a wheel rotational speed sensor, a loading status information acquiring unit, a correction amount setting unit, a velocity vector calculating unit, and a position calculating unit. The loading status information acquiring unit acquires loading status information indicating whether the body frame is in a loaded state or in an unloaded state. The correction amount setting unit calculates, based on the attitude information, a correction amount required for bringing detection axes in the loaded state into coincidence with corresponding detection axes in the unloaded state. The velocity vector calculating unit calculates the velocity vector of the haulage vehicle. The position calculating unit calculates a position of the haulage vehicle by using the velocity vector.

SUMMARY OF THE INVENTION

In one aspect, a method for monitoring operations of a machine operating at a worksite, is provided. The machine includes an implement for performing one or more implement operations and is powered by an engine. The method includes determining a first parameter corresponding to an engine speed associated with the engine, a second parameter indicative of vibrations detected inside the operator cabin and a third parameter indicative of a machine speed associated with the machine. The method further includes determining a machine operation as one of the loading operation, the dumping operation and a travelling operation based on one or more of the determined first parameter, second parameter and the third parameter.

In another aspect, a system for monitoring operations of a machine operating at a worksite, is provided. The machine includes an implement for performing one or more of loading and dumping operations and is powered by an engine. The system includes an accelerometer positioned inside an operator cabin of the machine, a position sensor and a processing unit communicatively coupled to the accelerometer, the machine speed sensor and an engine speed sensor associated with the engine. The processing unit is configured to determine a first parameter corresponding to an engine speed associated with the engine, a second parameter indicative of vibrations detected inside the operator cabin and a third parameter indicative of machine speed associated with the machine. The processing unit is further configured to determine a machine operation as one of the loading operation, the dumping operation and a travelling operation based on one or more of the determined first parameter, second parameter and the third parameter.

In yet another aspect, a machine is provided. The machine includes a machine frame, an operator cabin supported on the machine frame, an implement coupled to the machine frame and configured to perform one or more of a loading operation and a dumping operation, and an engine for powering the machine, the implement and the one or more controls. The machine further includes an engine speed sensor associated with the engine and configured to detect an engine speed during operations of the machine and a system for monitoring operations of the machine operating at a worksite. The system includes an accelerometer positioned inside an operator cabin of the machine, a position sensor and a processing unit communicatively coupled to the accelerometer, the machine speed sensor and an engine speed sensor associated with the engine. The processing unit is configured to determine a first parameter corresponding to an engine speed associated with the engine, a second parameter indicative of vibrations detected inside the operator cabin and a third parameter indicative of machine speed associated with the machine. The processing unit is further configured to determine a machine operation as one of the loading operation, the dumping operation and a travelling operation based on one or more of the determined first parameter, second parameter and the third parameter.

DETAILED DESCRIPTION

Figure 1:
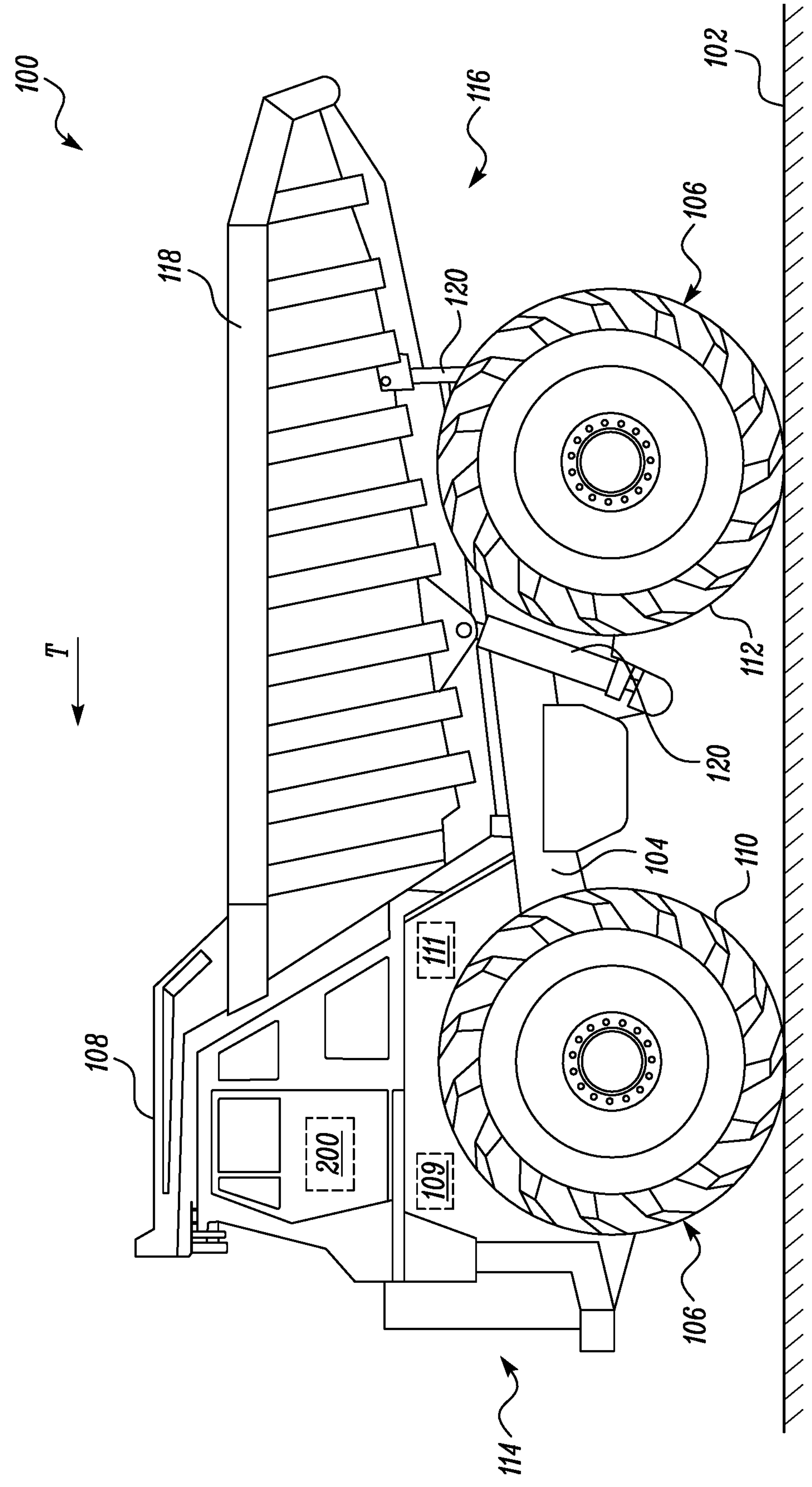
FIG. 1 illustrates an exemplary machine, according to the embodiments of the present disclosure.

The present disclosure relates to a system and method for monitoring operations of a machine operating at a worksite. To this end, FIG. 1 illustrates an exemplary machine 100 operating at a worksite 102, in accordance with the various embodiments of the present disclosure. The worksite 102 may include a mine site, a landfill, a quarry, a construction site, or any other type of worksite. In an embodiment of the present disclosure, the machine 100 may be an off-highway truck such as a haul truck. However, it may be contemplated that the machine 100 may be any type of machine configured to perform some type of operation associated with an industry such as mining, construction, farming, transportation, or any other industry. Other examples of the machine 100 may include, but not limited to, a dump truck, a wheel loader, a hydraulic excavator, or the like. Further, the machine 100 may be a manned machine or an unmanned machine. In some embodiments, the machine 100 may be a machine having a various level of autonomy, such as fully-autonomous machine, a semi-autonomous machine, or a remotely operated machine.

As shown in FIG. 1, the machine 100 includes a frame 104 that supports various components of the machine 100, such as a set of ground engaging members 106 and an operator cabin 108. In an exemplary embodiment, the ground engaging members 106, as shown in FIG. 1, include a pair of front wheels 110 and a pair of rear wheels 112 (only one side shown in FIG. 1). However, in other exemplary embodiments, the ground engaging members 106 may include endless tracks for maneuvering the machine 100 at the worksite 102. The movement of the ground engaging members 106 may be powered by a power source, such as an engine 109 via a transmission 111. The engine 109 may be based on one of the commonly applied power generation units, such as an internal combustion engine (ICE) having a V-type configuration, inline configuration, or an engine with different configurations, as are conventionally known. However, aspects of the present disclosure need not be limited to a particular type of power source.

The frame 104 defines a front end 114 and a rear end 116 of the machine 100. The terms 'front' and 'rear', as used herein, are in relation to a direction of travel of the machine 100, as represented by arrow, T, in FIG. 1, with said direction of travel being exemplarily defined from the rear end 116 towards the front end 114. The rear end 116 is supported on the rear wheels 112 and supports an implement 118, which performs one or more implement operations at the worksite 102. In one example, the implement 118 may be embodied as a dump body, hereinafter interchangeably referred to as the dump body 118. However, it may be contemplated that in other embodiments of the present disclosure, other types of implements, such as, but not limited to, bucket, ejector body, blades, scrapers, grapples, or the like may also be employed by the machine 100. Additionally, the position of the implement 118 being towards the rear end 116 of the machine 100 is exemplary and other positions of the implement 118 may also be contemplated without limiting the scope of the claimed subject matter. Further, examples of the one or more implement operations may include, but not limited to, loading or pickup operation and unloading operation (such as dumping operation).

The dump body 118 is a section in which a payload to be hauled, such as earth, sand, etc., is loaded. The dump body 118 is pivotally mounted to the frame 104, such that the dump body 118 may be raised or lowered, with respect to the frame 104. The machine 100 may further include a number of hydraulic actuators 120 to operate the dump body 118. The hydraulic actuators 120 are extended or retracted to raise or lower the dump body 118 to facilitate the one or more implement operations, such as dumping.

The operator cabin 108 may include an operator console (not shown), that may include various input-output controls for operating the machine 100 and the dump body 118. For example, the operator console may include, but not limited to, one or more of steering wheel, touch screens, display devices, joysticks, switches etc., to facilitate an operator in operating the machine 100 and the dump body 118. In one example, the operator console and/or the operator cabin 108 itself, may be provided on board the machine 100, while in other embodiments, the operator console may also be positioned remotely with respect to the machine 100 and/or the worksite 102.

In an embodiment of the present disclosure, the machine 100 further includes a system 200 for monitoring the machine 100 when it operates at the worksite 102. The detailed explanation of the system 200 and its various components and functionalities will now be described in conjunction to FIGS. 2 through 4.

In operation, the machine 100 may be configured to repeatedly travel between two locations to repeatedly perform one or more implement operations at the worksite 102. For example, the machine 100 may be configured to perform repeated travelling operations between a first location, such as a loading location and a second location, such as an unloading or dumping location. For example, an excavator or a wheel loader may be configured to dig work material from a pile and load the dump body 118, of the machine 100, with the dug work material at the loading location of the worksite 102. The machine 100 may perform a first travelling operation with the loaded dump body 118 from the loading location to the dumping location. Further, the implement 118 may be configured to perform a second implement operation, such as the unloading or dumping operation for dumping the work material at the unloading location. Once the dumping operation is complete, the machine 100 performs a second travel operation with the empty dump body 118 from the dumping location back to the loading location. Accordingly, the machine 100 performs the following operations to complete one operational cycle:

A. Loading operation at the loading location;

B. First travelling operation with loaded dump body from loading location to dumping location;

C. Dumping operation at the dumping location; and

D. Second travelling operation with empty dump body from dumping location to loading location.

The machine 100 may be required to repeatedly perform these operations (A, B, C and D) and hence repeatedly travel between the loading location and the dumping location until the entire pile of work material is transferred to the dumping location (indicating completion of an entire mining operation, for example).

According to an embodiment of the present disclosure, the system 200 is configured to monitor the various operations performed by the machine 100 at the worksite 102. The system 200 may be configured to facilitate in monitoring the overall productivity of the machine 100 in performing these operations. The system 200 may further facilitate an operator of the machine 100 and/or a supervisor of the entire mining operation at the worksite 102, to plan the machine operations more efficiently and increase the overall productivity of the operations and the machine 100.

In an embodiment of the present disclosure, the system 200 is implemented as a retrofittable telematics device configured to be retrofitted onto the machine 100. For example, the system 200 may be plugged into a service port (not shown) positioned inside the operator cabin 108 of the machine 100, such that the system 200 may be operatively connected to one or more on-board control modules of the machine 100 via the service port. However, it may be contemplated that the system 200 may be implemented as part of an existing telematics unit of the machine 100 or may be integrated into one of the existing on-board control modules of the machine 100, such as a machine electronic control module (ECM).

According to the embodiments of the present disclosure, the system 200 includes an accelerometer 202, a position sensor 204, a memory 206, an I/O unit 208, and a processing unit 210 communicatively coupled to the accelerometer 202, the position sensor 204, the memory 206 and the I/O unit 208.

In an embodiment of the present disclosure, the accelerometer 202 is configured to detect vibrations inside the operator cabin 108 as the machine 100 performs the loading operation, travel operations, and/or dumping operations at the worksite 102. For example, the accelerometer 202 is a triaxial accelerometer configured to detect one or more magnitude values of acceleration vector applied to the accelerometer 202 and hence the operator cabin 108, along a roll axis (X-axis), pitch axis (Y-Axis), and yaw axis (Z-axis) in both positive and negative directions. Consequently, the accelerometer 202 may be configured to create a 3-D vector of acceleration in the form of orthogonal components to determine the type of vibrations, such as lateral, transverse, or rotational. Examples of the accelerometer 202 may include, but not limited to, a piezoelectric accelerometer, or any other charge mode accelerometer known in the art.

The position sensor 204 is configured to detect a machine speed during operation at the worksite 102. In an exemplary embodiment of the present disclosure, the position sensor 204 is a Global Positioning Sensor (GPS) configured to detect the machine speed associated with the machine 100 as the machine operates at the worksite 102. For instance, the position sensor 204 is configured to use the location/position information associated with the machine 100 to determine a distance travelled by the machine 100 and the time taken to travel such distance and further calculate the machine speed based on the determined distance and the time. The detailed working of such GPS position sensors in determining the machine speed are well known in the art and hence not described herein for the sake of brevity of the disclosure. Although, the position sensor 204 is described herein as a GPS sensor, other mechanisms for determining the machine speed may also be used in alternative implementations without deviating from the scope of the claimed subject matter.

The memory 206 may include a random access memory (RAM) and read only memory (ROM). The RAM may be implemented by Synchronous Dynamic Random Access Memory (SDRAM), Dynamic Random Access Memory (DRAM), and/or any other type of random access memory device. The ROM may be implemented by a hard drive, flash memory and/or any other desired type of memory device. The processing unit 210 may include one or more microprocessors, microcomputers, microcontrollers, programmable logic controller, DSPs (digital signal processors), central processing units, state machines, logic circuitry, or any other device or devices that process/manipulate information or signals based on operational or programming instructions. The processing unit 210 may be implemented using one or more controller technologies, such as Application Specific Integrated Circuit (ASIC), Reduced Instruction Set Computing (RISC) technology, Complex Instruction Set Computing (CISC) technology, etc.

The processing unit 210 is further configured to be operatively connected to an engine ECM 212 associated with the engine 109 of the machine 100. The processing unit 210 may be configured to establish a datalink communication with the engine ECM 212 over an on-board datalink communication channel of the machine 100. The engine ECM 212 may in turn be operatively connected to an on-board engine speed sensor 214 associated with the engine 109 and configured to detect an engine speed at which the engine 109 operates during the various operations of the machine 100.

In an embodiment of the present disclosure, the processing unit 210 is configured to determine machine operations, i.e., whether the machine 100 is performing the dumping operation, loading operation or the travelling operation, based on one or more parameters determined using one or more of the accelerometer 202, the position sensor 204 and the engine speed sensor 214.

The processing unit 210 is configured to determine a first parameter P1 corresponding to an engine speed associated with the engine 109 of the machine 100. Similarly, the processing unit 210 is configured to determine a second parameter P2 indicative of the vibrations detected inside the operator cabin 108 of the machine 100 and a third parameter P3 indicative of the machine speed associated with the machine 100. In an embodiment of the present disclosure, the processing unit 210 is configured to determine the machine operation as one of the loading operation, the dumping operation and the travelling operation based on one or more of the first parameter P1, the second parameter P2, and the third parameter P3.

In an exemplary embodiment, the processing unit 210 may be configured to firstly check whether the machine 100 is performing the dumping operation or not. If the machine 100 is detected to be not performing the dumping operation, then the processing unit 210 subsequently checks whether the loading operation is being performed or not. Further, if the machine 100 is detected to be not performing the loading operation, then the processing unit 210 may be configured to check if the machine 100 is performing the travelling operation. Finally, if none of the dumping, loading or travelling operations are detected, then the machine 100 is detected to be non-operational or stopped. This means, that the processing unit 210 may be configured to evaluate one or more predefined conditions associated with each of the dumping operation, the loading operation and the travelling operation to determine the machine operations. The details of the parameters P1, P2, and P3, the predefined conditions, and how they are used in determining the machine operations will now be described in greater detail in the following description.

Detecting Dumping Operation

In order to detect the dumping operation, the processing unit 210 is configured to detect an idling state associated with the engine 109 as the machine 100 operates at the worksite 102. For example, the processing unit 210 may be configured to receive the engine idling state from the engine ECM 212. In some examples, the engine ECM 212 may determine the engine idling state corresponding to an operator input, such as when the operator selects a park or neutral transmission mode of the machine 100. However, other ways of determining the engine idling state may also be employed without deviating from the scope of the claimed subject matter.

Once the engine 109 is detected to be in an idle state, the processing unit 210 is configured to receive a set of engine idling speed values for a first predefined time duration $D_1$, from the engine ECM 212. For the purposes of explanation, the first predefined time duration $D_1$ is taken to be a time window of 10 seconds and the engine speed sampling frequency is 1 Hz per second, i.e., the engine idling speed value is obtained every second during the first predefined time duration $D_1$. However, in other embodiments, the first predefined time duration $D_1$ as well as the engine idling speed sampling frequency may be varied to achieve similar results without deviating from the scope of the claimed subject matter.

Further, during the dumping operation, while in the idling state, the engine 109 is configured to power the hydraulic actuators 120 (shown in FIG. 1) for raising and lowering the dump body 118 of the machine 100. Thus, the engine idling speed values correspond to high engine idling values, i.e., are greater than a first threshold value $TH_1$. In an exemplary implementation, the first threshold value $TH_1$ may lie within a range of 1550 rpm to 1650 rpm and in the illustrated example, the first threshold value $TH_1$ is 1600 rpm.

In an embodiment of the present disclosure, the processing unit 210 is configured to perform exponential smoothing on the obtained set of raw engine idling speed values to obtain smoothed values of the engine speed. For example, the exponential smoothing is obtained based on the following equation:

$$s_t=\alpha x_t+(1-\alpha)s_{t-1}, t>0 \quad \text{(eq. 1)}$$

where, $x_t$ corresponds to the raw engine speed value;

t corresponds to the time instance;

$s_t$ is the output of the exponential smoothing; and $\alpha$ is the smoothing factor and $0<\alpha<1$ Based on the above, the processing unit 210 obtains a set $S_1$ of exponentially smoothed engine speed values $s_t$ for the first predefined time duration $D_1$ as $S_1=\{s_t1, s_t2 \ldots s_t10\}$ corresponding to values obtained for every second (i.e., 1-10 seconds) within the predefined time duration $D_1$. Although, the processing unit 210 is described herein to use the above mentioned equation 1 to perform exponential smoothing on the engine speed values, it may be contemplated that in some alternative embodiments, double or triple exponential smoothing may also be applied to the raw engine speed values to obtain the smoothed values of engine idling speed.

Further, the processing unit 210 is configured to determine a variation existing within the set $S_1$ of exponentially smoothed engine speed values obtained for the first predefined time duration $D_1$. For example, the processing unit 210 may be configured to obtain a standard deviation associated with the set $S_1$. The processing unit 210 may obtain the standard deviation based on the following equation:

$$\sigma = \sqrt{\frac{\sum (x_i-\mu)^2}{n}} \quad \text{(eq. 2)}$$

where, $\sigma$ is the standard deviation of the set $S_1$;

x is each value of $s_t$ in the set $S_1$;

$\mu$ is the mean value of the set $S_1$ (calculated as the average of all the data values in the set $S_1$), and n is the total number of data values within the set $S_1$ (which, in the illustrated embodiment, is 10)

In an embodiment of the present disclosure, the determined standard deviation $\sigma$ is used as the first parameter P1 by the processing unit 210 for determining if the machine 100 is performing the dumping operation for the entire first predefined time duration $D_1$. Although the present disclosure is described with reference to obtaining the engine idling speed values for 10 seconds, in some other implementations, the processing unit 210 may be configured to obtain the engine idling speed values for a longer duration of time, such as for 30 seconds, 1 minutes, 2 minutes, etc., and obtain the standard deviation $\sigma$ of the entire dataset in a similar manner, as described above, for the purposes of determining if the machine 100 is performing the dumping operation for that duration. Furthermore, it may also be contemplated that using the exponentially smoothed engine speed values is also merely exemplary and that, in certain alternative embodiments, raw engine speed values may also be used to obtain the standard deviation $\sigma$ without deviating from the scope of the claimed subject matter.

Further, the processing unit 210 is configured to detect the machine speed (the third parameter P3) using the position sensor 204 for the first predefined time duration $D_1$. This means, the processing unit 210 is configured to receive a set of machine speed values for the first predefined time duration $D_1$. As described previously, the machine speed is in the form of GPS speed as detected by the GPS position sensor within the system 200. The machine speed values, similar to the engine speed values, may be obtained at a sampling frequency of 1 Hz per second, i.e., the machine speed is obtained every second during the first predefined time duration $D_1$.

In an embodiment, the processing unit 210 is configured to detect that the machine 100 is performing the dumping operation when the following conditions are satisfied:

1. The engine 109 is detected to be operating in the idle state;

2. Each of the exponentially smoothed engine speed values $s_t$ in the set $S_1$ for the first predefined time duration $D_1$ is greater than or equal to the first threshold value $TH_1$. That is, in the illustrated example, the processing unit 210 is configured to determine if each of the exponentially smoothed engine speed values $s_t$ are greater than or equal to 1600 rpm for a continuous period of 10 seconds (i.e., the first predefined time duration $D_1$);

3. The determined standard deviation $\sigma$ (i.e., in this case, the first parameter P1) for the set $S_1$ is less than or equal to a second threshold value $TH_2$, thereby indicating low deviation in the engine speed values obtained for the duration $D_1$. In an exemplary embodiment, the second threshold value $TH_2$ may be within a range of 20 rpm to 30 rpm and in the illustrated example is 25 rpm.

4. The determined machine speed (that is the third parameter P3) is less than or equal to a third threshold $TH_3$. For instance, in order to perform the dumping operation, the machine 100 is expected to be not moving or moving at a very low speed, such as lower than or equal to 2 miles per hour. Thus, in an exemplary embodiment, the third threshold value $TH_3$ lies within a range of 0 miles per hour to 3 miles per hour. In the illustrated example, the third threshold value $TH_3$ is 2 miles per hour.

In an exemplary embodiment, the threshold values $TH_1$, $TH_2$ and $TH_3$ are merely exemplary and may be varied to obtain similar results. In certain embodiments of the present disclosure, these threshold values $TH_1$, $TH_2$ and $TH_3$ may be continuously updated by the processing unit 210 based on machine learning over a period of time, to improve the accuracy and overall efficiency of the system 200.

In operation, when the machine 100 performs the dumping operation, the engine idling speed may increase while operating the hydraulic actuators 120 to raise and lower the dump body 118 and follow a preset pattern of mild variations. Therefore, when the machine 100 is determined to be nearly stationary, the engine 109 is determined to be operating in idle state and the engine speed corresponds to high engine idling speed and follows the preset pattern having a low standard deviation, then the processing unit 210 is configured to determine that the machine 100 has been performing the dumping operation for the entire first predefined time duration $D_1$.

Subsequently, the processing unit 210 may be configured to similarly determine the dumping operation for the next time window(s), such as for every 10 seconds window subsequently, until the processing unit 210 detects that the machine 100 has stopped performing the dumping operation. For instance, as soon as one of the above mentioned conditions are unfulfilled, then the processing unit 210 may determine that the machine 100 stopped performing the dumping operation. Thus, if the machine 100 starts moving and the engine 109 is not detected to be in idling state, or if the engine idling speed is detected to be below the first threshold $TH_1$ for a continuous time window or if the standard deviation detected for a specific time window is greater than the second threshold value $TH_2$, then the processing unit 210 may be configured to detect that the machine 100 is no longer performing the dumping operation.

Further, the processing unit 210 is configured to identify a time taken $TT_1$ by the machine 100 to perform the dumping operation. For instance, when the processing unit 210 detects 12 consecutive 10 seconds windows in which the machine 100 is determined to be performing the dumping operation, and on the $13^{th}$ time window the machine 100 is detected not to be performing the dumping operation, then the processing unit 210 may be configured to identify 120 seconds or 2 minutes as the time taken $TT_1$ by the machine 100 to complete one dumping operation. The processing unit 210 may be further configured to store the determined time taken $TT_1$ by the machine 100 to complete the dumping operation. Such data may be stored in the memory 206 of the system 200 or alternatively, may be transmitted to an external remote server for storage. The processing unit 210, may similarly, be configured to determine and store the time taken to complete the multiple dumping operations by the machine 100, during an entire day or week, for example. It may be contemplated that the time taken to complete such dumping operations may be same or different for every dumping operation. In some embodiments of the present disclosure, the processing unit 210 may be configured to store such information along with time stamps to indicate the exact time of the day when the machine 100 was detected to be performing the dumping operation.

Additionally, in some alternative embodiments, the processing unit 210 may also use a GPS location of the machine 100 to enhance the accuracy or verify the determination that the machine 100 is performing the dumping operation. For instance, the dumping location at the worksite 102 may be predefined and stored in the external remote server (not shown) associated with the worksite 102, and in addition to the above mentioned four conditions, when the GPS location of the machine 100 is also detected to be same as the dumping location, then the processing unit 210 may be configured to determine that the machine 100 is performing the dumping operation.

Detecting Loading Operation

According to an embodiment of the present disclosure, the processing unit 210 is configured to determine that the machine 100 is performing the loading operation based at least on the second parameter P2, indicative of the vibrations detected inside the operator cabin 108. For instance, when the loading operation is being performed, heavy jolts of vibrations may be detected by the accelerometer 202 every time work material is thrown onto the dump body 118 and the processing unit 210 is configured to identify such heavy jolts of vibrations and determine that the machine 100 is performing the loading operation when such heavy jolts occur.

To this end, the processing unit 210 is configured to receive a set $S_2$ of magnitude values of acceleration vector applied to the accelerometer 202 (positioned inside the operator cabin 108) along each of the X-axis, Y-axis, and Z-axis in both positive as well as the negative directions. The set $S_2$ includes magnitude values that are obtained for a sample time window, such as a second predefined time duration $D_2$ and at a sampling frequency of 1 Hz per second, i.e., one acceleration vector magnitude value is obtained every second during the second predefined time duration $D_2$. In an exemplary implementation, the second predefined time duration $D_2$ is 5 seconds, however, other time durations and sampling frequency may also be implemented to achieve similar results without deviating from the scope of the claimed subject matter.

Accordingly, the set $S_2$ includes one set each for every axis as follows:

$S_2(1)=\{x1, x2, x3, x4, x5\}$—corresponding to magnitude of acceleration vector applied along X-axis in both positive as well as negative direction for the second predefined time duration $D_2$;

$S_2(2)=\{y1, y2, y3, y4, y5\}$—corresponding to magnitude of acceleration vector applied along positive Y-axis in both positive as well as negative direction for the second predefined time duration $D_2$;

$S_2(3)=\{z1, z2, z3, z4, z5\}$—corresponding to magnitude of acceleration vector applied along the Z-axis in both positive as well as negative direction, for the second predefined time duration $D_2$;

In an embodiment of the present disclosure, the processing unit 210 is further configured to obtain a statistical range SR associated with each of the received set $S_2(1)$, $S_2(2)$ and $S_2(3)$. The statistical range indicates a maximum dispersion within the received sets and is calculated as a difference between the lowest value and the highest value within the set. For the purposes of explanation, consider the following set of exemplary acceleration vector magnitude values measured along the X-axis:

$$S_2(1)=\{350,275,100,-150,-300\}$$

In the above example, the statistical range SR is calculated as $$SR_x=350-(-300)=650.$$

Similar to the above example for X-axis, the processing unit 210 may also be configured to receive the datasets for Y-axis and X-axis and obtain a respective statistical range $SR_Y$ and $SR_Z$ for the two for the second predefined time duration $D_2$. In case of detecting the loading operation, the determined statistical ranges $SR_X$, $SR_Y$, $SR_Z$ are considered as the second parameter P2 by the processing unit 210 for further process.

In an alternative embodiment, the processing unit 210 may be configured to first obtain a set $S_2(4)$ of absolute scalar magnitude values of acceleration applied to the accelerometer 202 for the second predefine time duration $D_2$.

Thus, in the above example, the set of absolute scalar magnitude values can be obtained using the following equation:

$$S_2(4)=\{S1,S2,S3,S4,S5\}, \text{ where}$$

$$Si=\overrightarrow{X_i^2+Y_i^2+Z_i^2} \quad \text{(eq. 3)}$$

Further, the processing unit 210 is configured to determine the statistical range SR for the set $S_2(4)$ in a similar manner as described above to be used as the second parameter P2.

Further, in an embodiment of the present disclosure, the processing unit 210 is further configured to determine the engine idling state (in a similar manner as described above for dumping detection) from the engine ECM 212. The processing unit 210 is further configured to additionally obtain a set $S_3$ of engine speed values (i.e., the first parameter P1) for the second predefined time duration $D_2$, which is 5 seconds in this example. In case of loading operation, the engine speed values may be raw values as received from the engine ECM 212. For instance, during the loading operation, the engine 109 operates in the idling state and does not actually power any auxiliary components of the machine 100. Thus, the engine idling speed values correspond to low engine idling values, i.e., are less than or equal to a fourth threshold value $TH_4$. In an exemplary implementation, the fourth threshold value $TH_4$ may lie within a range of 700 rpm to 900 rpm and in the illustrated example, the fourth threshold value $TH_4$ is 800 rpm.

Additionally, the processing unit 210 is configured to detect the machine speed (the third parameter P3) using the position sensor 204 during the second predefined time duration $D_2$. This means, the processing unit 210 is configured to receive a set of machine speed values for the second predefined time duration $D_2$. As described previously, the machine speed is in the form of GPS speed as detected by the GPS position sensor within the system 200. The engine speed values, and the machine speed values, similar to the acceleration vector magnitude values, may also be obtained at a sampling frequency of 1 Hz per second.

In an embodiment, the processing unit 210 is configured to detect that the machine 100 is performing the loading operation for the entire second predefined time duration $D_2$, when the following conditions are satisfied:

1. The engine 109 is detected to be operating in the idle state;

2. Each of the engine speed values in the set $S_3$ for the second predefined time duration D2 is less than or equal to the fourth threshold value $TH_4$. That is, in the illustrated example, the processing unit 210 is configured to determine if the engine idling speed values are less than or equal to 800 rpm for a continuous period of 5 seconds (i.e., the second predefined time duration $D_2$);

3. The determined statistical range $SR_X$, $SR_Y$, $SR_Z$ for at least one of the sets $S_2(1)$, $S_2(2)$, $S_2(3)$ and/or the statistical range SR for the set $S_2(4)$ of absolute scalar magnitude values (i.e., in this case, the second parameter P2), is greater than or equal to a fifth threshold value $TH_5$ and less or equal to a sixth threshold value $TH_6$. In one example, the fifth threshold value $TH_5$ is 400 m/s$^2$ and the sixth threshold value $TH_6$ is 700 m/s$^2$. The values of the fifth threshold value $TH_5$ and the sixth threshold value $TH_6$ may be selected such that they correspond to strong vibrations only, which may be detected only when the machine 100 is performing the loading operation. It may be contemplated that a high dispersion (i.e., a high statistical range SR value) amongst the data values indicate a strong vibration whereas a low dispersion (i.e., a low statistical range SR value) indicates a slight vibration detected by the accelerometer 202 positioned inside the operator cabin 108. Thus, when the SR value for even one of the axis is detected to be within the range of 400 m/s$^2$ to 700 m/s$^2$, then this condition is considered to be satisfied.

In an exemplary embodiment, the threshold values $TH_4$, $TH_5$ and $TH_6$ are merely exemplary and may be varied to obtain similar results. For example, these threshold values $TH_4$, $TH_5$ and $TH_6$ may be updated by the processing unit 210 based on machine learning over a period of time, to improve the accuracy of the system 200.

In addition to the above three conditions, the processing unit 210 may additionally/optionally also detect if the determined machine speed (that is the third parameter $P_3$) is less than or equal to the third threshold $TH_3$. For instance, in order to perform the loading operation, the machine 100 is expected to be not moving or moving at a very low speed, such as lower than or equal to 2 miles per hour. Thus, in an exemplary embodiment, the third threshold value $TH_3$ lies within a range of 0 miles per hour to 3 miles per hour. As described above, in the illustrated example, the third threshold value $TH_3$ is 2 miles per hour.

Subsequently, the processing unit 210 may be configured to similarly determine the loading operation for the next time window(s), such as for every 5 seconds window subsequently, until the processing unit 210 detects that the machine 100 has stopped performing the loading operation. For instance, as soon as the processing unit 210 detects that the machine 100 has started moving and the engine 109 is not detected to be in idling state continuously for a specific time window (such as a third predefined time duration $D_3$, wherein $D_3$ is greater than $D_2$), then the processing unit 210 may be configured to detect that the machine 100 is no longer performing the loading operation.

Further, the processing unit 210 is configured to identify a time taken $TT_2$ by the machine 100 to complete the loading operation. For instance, the processing unit 210 detects a start of loading operation when all of the conditions stated above are met for the first time instant. Further, the processing unit 210 may be configured to detect the end of loading operation when the machine 100 starts moving at a speed greater than 2 miles per hour and the engine 109 is no longer operating in the idle state. Based on the start and end of the loading operation, the processing unit 210 may be configured to identify the time taken $TT_2$ by the machine 100 to complete one loading operation. The processing unit 210 may be further configured to store the determined time taken $TT_2$ by the machine 100 to complete the loading operation. Such data may be stored in the memory 206 of the system 200 or alternatively, may be transmitted to an external remote server for storage. The processing unit 210, may similarly, be configured to determine and store the time taken to complete the multiple loading operations by the machine 100, during an entire day or week, for example. It may be contemplated that the time taken to complete such loading operations may be same or different for every loading operation. In some embodiments of the present disclosure, the processing unit 210 may be configured to store such information along with time stamps to indicate the exact time of the day when the machine 100 was detected to be performing the loading operation.

Additionally, in some alternative embodiments, the processing unit 210 may also use a GPS location of the machine 100 to enhance the accuracy or verify the determination that the machine 100 is performing the loading operation. For instance, the loading location at the worksite 102 may be predefined and stored in the external remote server (not shown) associated with the worksite 102, and in addition to the above mentioned four conditions, when the GPS location of the machine 100 is also detected to be same as the loading location, then the processing unit 210 may be configured to determine that the machine 100 is performing the loading operation.

Detecting Travelling Operation

The processing unit 210 is additionally configured to determine if the machine 100 is performing the travelling operation if conditions for dumping and/or loading operations are not met. In an exemplary embodiment of the present disclosure, the processing unit 210 is configured to determine that the machine 100 is performing the travelling operation based at least on the second parameter P2 indicative of the vibrations detected by the accelerometer 202 inside the operator cabin 108.

To this end, the processing unit 210 is configured to receive a plurality of sets $S_4$ of magnitude values of acceleration vector applied to the accelerometer 202 (positioned inside the operator cabin 108) along each of the X-axis, Y-axis, and Z-axis in both positive as well as the negative directions, for a fourth predefined time duration $D_4$. In an exemplary implementation, each of the plurality of sets $S_4$ includes a subset of magnitude values that are obtained for a fifth predefined time duration $D_5$, such that $D_5$ is less than $D_4$. In an exemplary implementation, $D_4$ is 5 seconds and $D_5$ is selected as 1 second time duration. Further, the sampling frequency for obtaining the acceleration vector magnitude values in this case is 10 Hz per second. This means, the set S4 for X-axis contains 5 subsets having 10 data values in every set, making the total of 50 data values in the entire set. Consider the following example:

$S4_X$ (corresponding to dataset for 5 seconds ($D_4$))={$S5_X$, $S6_X$, $S7_X$, $S8_X$, $S9_X$}; wherein $S5_X$ (corresponding to dataset for 1 second ($D_5$))={A1, A2, A3 . . . A10};

$S6_X$ (corresponding to dataset for 1 second ($D_5$))={B1, B2, B3 . . . B10};

$S7_X$ (corresponding to dataset for 1 second ($D_5$))={C1, C2, C3 . . . C10}, $S8_X$ (corresponding to dataset for 1 second ($D_5$))={D1, D2, D3 . . . D10}

$S9_X$ (corresponding to dataset for 1 second ($D_5$))={E1, E2, E3 . . . E10}

Similar to the above, the processing unit 210 is configured to receive the sets $S_4$ for both Y-axis and the Z-axis.

In an embodiment of the present disclosure, the processing unit 210 is configured to determine a median absolute deviation M, a mean absolute deviation N and a standard deviation SD for each subset within each of the plurality of sets for X-axis, Y-axis, Z-axis.

For the above sample subset $S5_X$, the processing unit 210 is configured to obtain the median absolute value M using the following equation: (the steps shown are for one subset $S5_X$ only and the same can be used for all the other subsets for all the three axis as well):

$$M=\text{median}(|Xi-\text{median}(X)|) \quad \text{(eq. 4)}$$

Where, X is the dataset value. This means,

1. Obtain the median of the dataset
2. Subtract median from every value in the set $S5_X$;
3. Obtain absolute value of these differences; and
4. Obtain the median of these revised set of differences obtained in step 3.

Based on the above, the processing unit 210 is configured to obtain the median absolute deviation M for all the subsets, thereby obtaining 5 median absolute deviations $M1_X$ for set $S5_X$, $M2_X$ for set $S6_X$, $M3_X$ for set $S7_X$, $M4_X$ for set $S8_X$, and $M5_X$ for set $S9_X$ for X-axis. Similarly, the processing unit 210 obtains 5 median absolute deviation values for Y-axis and the Z-axis.

Further, the processing unit 210 is configured to obtain a fourth parameter P4 (in this example, for the X-axis) indicative of sum of the plurality of median absolute deviation M values. Thus, $$P4_X = \sum_{i=1}^{n} M_i \text{ (wherein } n \text{ is 5 in this example)}$$

Furthermore, the fourth parameter P4 is also determined for each of Y-axis and Z-axis in the same manner.

In an embodiment of the present disclosure, the processing unit 210 is further configured to obtain the mean absolute value N using the following equation: (the steps shown are for one subset $S5_X$ only and the same can be used for all the other subsets for all the three axis as well):

$$N=\Sigma|X_i-\text{mean}(X)|/n \quad \text{(eq. 5)}$$

Where, X is the dataset value and n are the number of data values within the set. This means:

1. Obtain the mean of the dataset;
2. Subtract mean from every value in the set $S5_X$;
3. Obtain absolute value of these differences;
4. Obtain a sum of these differences obtained in step 3; and
5. Divide the sum by the total number of data values in the set to obtain the mean absolute deviation N of the set.

Based on the above, the processing unit 210 is configured to obtain the mean absolute deviation N for all the subsets, thereby obtaining 5 mean absolute deviations $N1_X$ for set $S5_X$, $N2_X$ for set $S6_X$, $N3_X$ for set $S7_X$, $N4_X$ for set $S8_X$, and $N5_X$ for set $S9_X$ for X-axis. Similarly, the processing unit 210 obtains 5 median absolute deviation values for Y-axis and the Z-axis also.

Further, the processing unit 210 is configured to obtain a fifth parameter P5 (in this example, for the X-axis) indicative of sum of the plurality of mean absolute deviation N values. Thus, $$P5_X = \sum_{i=1}^{n} N_i \text{(wherein } n \text{ is 5 in this example)}$$

Similarly, the fifth parameter P5 is also determined for each of the Y-axis and Z-axis in the same manner.

Additionally, the processing unit 210 is configured to obtain a standard deviation SD associated with each subset within the set S4 for each of the X-axis, Y-axis and Z-axis. The processing unit 210 may determine the standard deviation SD using the equation 2 provided previously. Thus, the processing unit 210 is configured to obtain 5 standard deviations $SD1_X$ for set $S5_X$, $SD2_X$ for set $S6_X$, $SD3_X$ for set $S7_X$, $SD4_X$ for set $S8_X$, and $SD5_X$ for set $S9_X$ for X-axis. Similarly, the processing unit 210 obtains 5 standard deviation SD values for Y-axis and the Z-axis also.

Further, the processing unit 210 is configured to obtain a sixth parameter P6 (in this example, for the X-axis) indicative of sum of the plurality of standard deviation SD values. Thus, $$P6_X = \sum_{i=1}^{n} SD_i \text{ (wherein } n \text{ is 5 in this example)}$$

Similarly, the sixth parameter P6 is also determined for each of the Y-axis and Z-axis in the same manner.

In an embodiment of the present disclosure, the processing unit 210 is configured to determine that the machine 100 is performing the travelling operation for the fourth predefined time duration $D_4$ based on the fourth parameter P4, fifth parameter P5, sixth parameter P6 when the following conditions are satisfied:

1. The fourth parameter P4, for at least one of the X-axis, Y-axis, Z-axis, is greater than a seventh threshold value $TH_7$. In an exemplary embodiment, the seventh threshold value $TH_7$ lies within a range of 50 $m/s^2$-150 $m/s^2$ and in the illustrated example, is equal to 100 $m/s^2$;

2. The fifth parameter P5, for at least one of the X-axis, Y-axis, Z-axis, is greater than an eighth threshold value $TH_8$. In an exemplary embodiment, the eighth threshold value $TH_8$ lies within a range of 100 $m/s^2$-200 $m/s^2$ and in the illustrated example, is equal to 150 $m/s^2$;

3. The sixth parameter P6, for at least one of the X-axis, Y-axis, Z-axis, is greater than a ninth threshold value $TH_9$. In an exemplary embodiment, the ninth threshold value $TH_9$ lies within a range of 100 $m/s^2$-200 $m/s^2$ and in the illustrated example, is equal to 150 $m/s^2$.

In an exemplary embodiment, the threshold values $TH_7$, $TH_8$ and $TH_9$ are merely exemplary and may be varied to obtain similar results. For example, these threshold values $TH_7$, $TH_8$ and $TH_9$ may be updated by the processing unit 210 based on machine learning over a period of time, to improve the accuracy of the system 200.

Subsequently, the processing unit 210 may be configured to similarly determine that the machine 100 is travelling when consecutively for subsequent time windows the conditions are satisfied. Further, as soon as the processing unit 210 detects that the machine 100 has started stopped and/or the engine 109 is detected to be operating in idling state continuously for a specific time window (such as a sixth predefined time duration $D_6$, wherein $D_6$ is greater than $D_4$), then the processing unit 210 may be configured to detect that the machine 100 is no longer moving.

Further, the processing unit 210 is configured to identify a time taken $TT_3$ by the machine 100 to complete the travelling operation. For instance, when the processing unit 210 detects a start of travelling operation when all of the conditions stated above are met for the first time. Further, the processing unit 210 may be configured to detect the end of travelling operation when the machine 100 stops moving and the engine 109 starts operating in the idle state. Based on the start and end of the travelling operation, the processing unit 210 may be configured to identify the time taken $TT_3$ by the machine 100 to complete one travelling operation. The processing unit 210 may be further configured to store the determined time taken $TT_3$ by the machine 100 to complete the travelling operation. Such data may be stored in the memory 206 of the system 200 or alternatively, may be transmitted to an external remote server for storage. The processing unit 210, may similarly, be configured to determine and store the time taken to complete the multiple travelling operations by the machine 100, during an entire day or week, for example. It may be contemplated that the time taken to complete such travelling operations may be same or different for every travelling operation. In some embodiments of the present disclosure, the processing unit 210 may be configured to store such information along with time stamps to indicate the exact time of the day when the machine 100 was detected to be travelling.

Furthermore, based on when the travelling operation is detected, the processing unit 210 may be configured to identify whether the machine 100 is travelling with a loaded dump body 118 or with an empty dump body 118. For instance, when the travelling operation is detected after completion of a loading operation, then processing unit 210 may detect that the machine 100 is travelling with a loaded dump body 118. Similarly, if the travelling operation is detected after completion of a dumping operation, then the processing unit 210 may be configured to detect the machine 100 is travelling with an empty dump body 118.

Additionally, the processing unit 210 is configured to detect that the machine 100 is non-operational or stopped when conditions for all the other operations (i.e., the dumping operation, the loading operation, and the travelling operation) are determined to be not satisfied. Similar to all the other operations, the processing unit 210 may be configured to determine a time duration taken TT4 by the machine 100 while it was non-operational or stopped.

In a further embodiment of the present disclosure, the processing unit 210 may be configured to use machine learning model for detecting the machine operations at the worksite. To this end, the system 200 may additionally include a machine learning module 216 configured to be trained for detecting the machine operations by using one or more machine learning algorithms.

Figure 2:
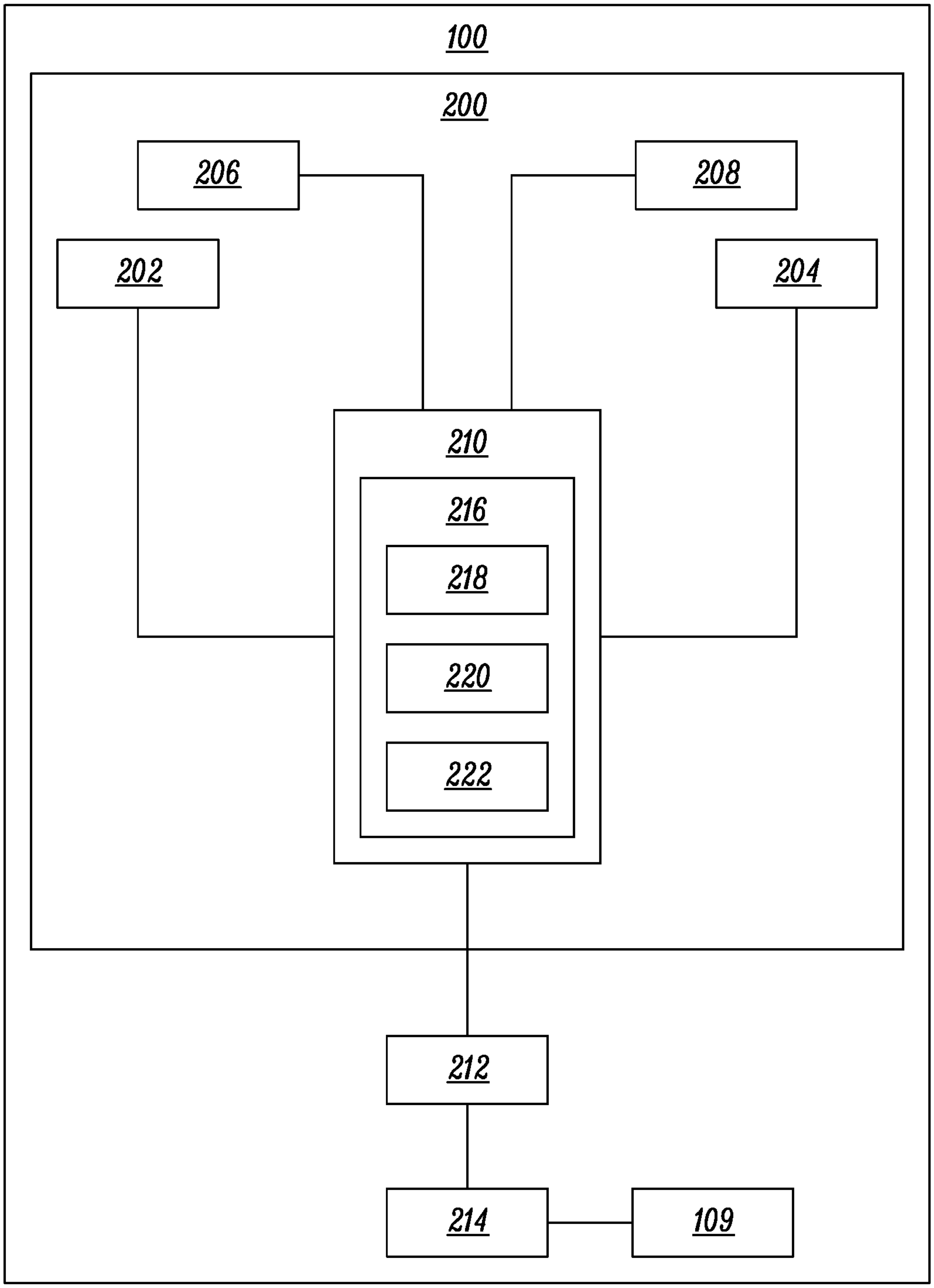
FIG. 2 illustrates an exemplary system for monitoring the machine operating at the worksite, according to the embodiments of the present disclosure.

The machine learning module 216 is configured to execute the instruction stored in the memory 206, to perform one or more predetermined operations. As shown in FIG. 2, the machine learning module 216 may include an observation module 218, a learning module 220, and a decision module 222 to perform the one or more predetermined operations. The machine learning module 216 may be a data processor and/or a mainframe employing artificial intelligence (AI) to perform the one or more predetermined operations, in accordance with the embodiments of the present disclosure. In some embodiments, the machine learning module 216 may be implemented within processing unit 210 as shown. However, in some alternative embodiments, the machine learning module 216 may be a specially constructed computing platform for carrying out the predetermined operations as described herein. The machine learning module 216 may be implemented or provided with a wide variety of components or systems (not shown), including one or more of memories, registers, and/or other data processing devices and subsystems.

The machine learning module 216 may be any system configured to learn and adapt itself to do better in changing environments. The machine learning module 216 may employ any one or combination of the following computational techniques: neural network, constraint program, fuzzy logic, classification, conventional artificial intelligence, symbolic manipulation, fuzzy set theory, evolutionary computation, cybernetics, data mining, approximate reasoning, derivative-free optimization, decision trees, and/or soft computing.

The machine learning module 216 may implement an iterative learning process. The learning may be based on a wide variety of learning rules or training algorithms. The learning rules may include one or more of back-propagation, patter-by-pattern learning, supervised learning, and/or interpolation. As a result of the learning, the machine learning module 216 may learn to determine the operations being performed by the machine 100.

The observations module 218 is configured to receive a training data set and a validation data set. In an exemplary implementation, the observation module 218 may be configured to receive a plurality of first parameters P1, the second parameters P2, and the third parameters P3 as input parameters in the training data set. The first parameter P1 may include the engine speed values (including raw engine speed values as well as the exponentially smoothed engine speed values). The second parameter P2 may include the acceleration vector magnitude values detected by the accelerometer 202. The third parameter P3 may include the machine speed values as detected by the position sensor 204 (i.e., the GPS sensor in the present example). The observation module 218 is further configured to receive the resultant machine operations corresponding to the respective parameters as output in the training dataset. Further, the observation module 218 is configured to receive the validation dataset including only the input parameters.

Based on the training dataset, the learning module 220 is configured to learn by correlating the output machine operations and the input first parameter P1, second parameter P2, and third parameter P3 In an embodiment of the present disclosure, the decision module 222 is configured to determine one or more correlations between the input parameters and the output machine operations. For example, the decision module 222 may be configured to update the one or more threshold values used in the conditions provided above for each of the dumping, loading, and travelling operations based on the determined correlations between the input parameters and the machine operations. The learning module 220 is further configured to test the determined correlations on the validation dataset to determine the output machine operations corresponding to the input parameters in the validation dataset.

Further, according to an embodiment of the present disclosure, the processing unit 210 is configured to generate and display a machine operations report for indicating a total time taken by the machine 100 to perform each of the dumping operation, loading operation and travelling operation. For example, the processing unit 210 may be configured to receive the stored time durations, such as the first time duration $TT_1$, the second time duration $TT_2$, the third time duration $TT_3$ and the fourth time duration $TT_4$ indicative of the total time taken by the machine 100 to perform multiple dumping operations, loading operations, travelling operations and when the machine 100 was stopped, respectively.

Figure 3:
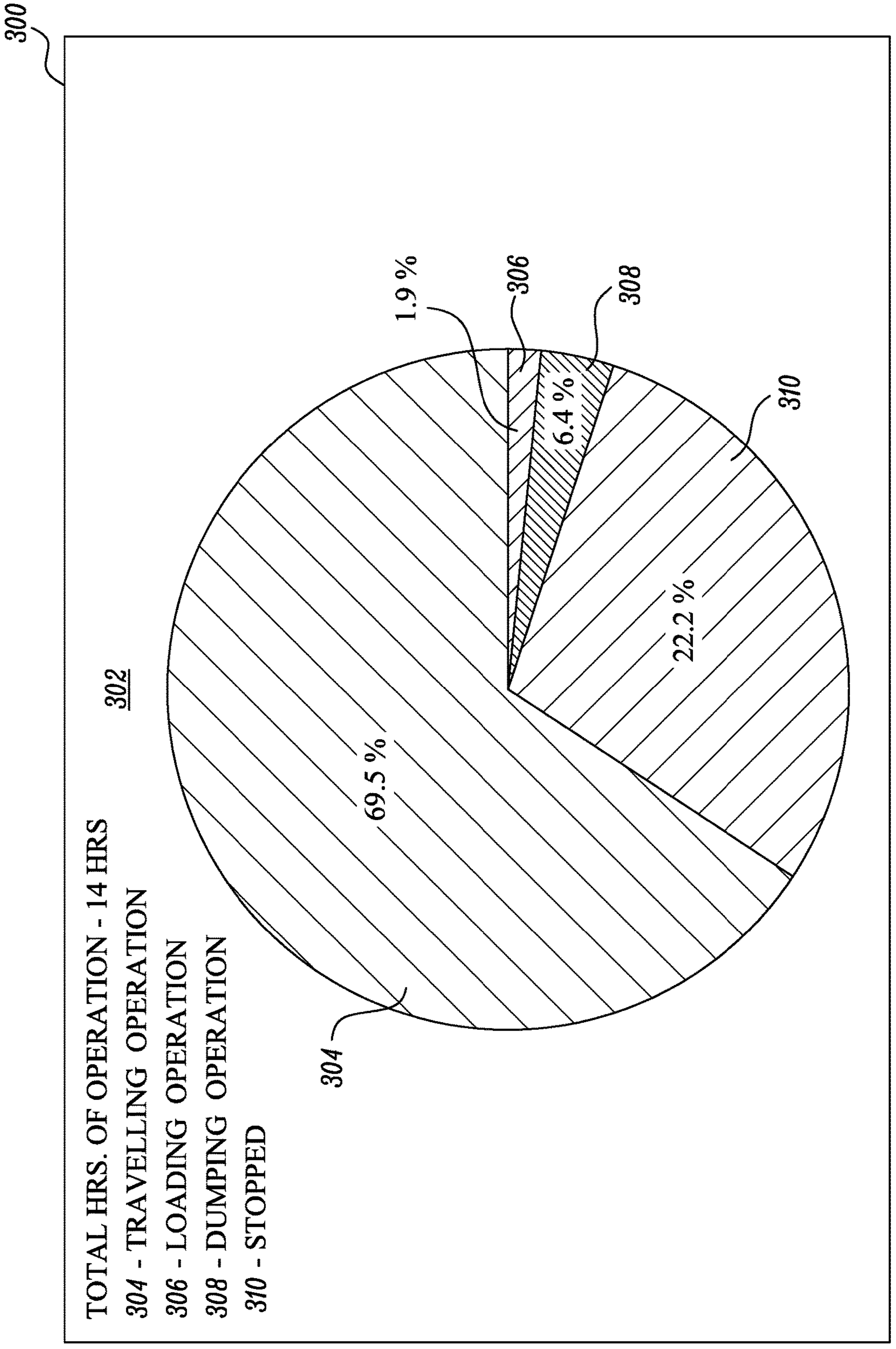
FIG. 3 illustrates an exemplary display device for displaying a machine operations report, according to the embodiments of the present disclosure.

FIG. 3 illustrates an exemplary machine operations report 302 displayed on a display device 300 associated with the machine 100. In some examples, the display device 300 may be positioned inside the operator cabin 108 of the machine 100. However, in some alternative embodiments, the display device 300 may be positioned remotely in a remote operator station at the worksite 102 in case of a semi or fully autonomous machine 100.

For example, the machine 100 may be configured to operate for a time duration in a day, such as 14 hours, at the worksite 102. The processing unit 210 may be configured to obtain a total time of operation as a sum of $TT_1$, $TT_2$, $TT_3$ and $TT_4$. Therefore, in the total time of operation in the day, the machine 100 may have performed multiple dumping operations, multiple loading operations and multiple travelling operations. The machine 100 would also have stopped at multiple times during the day. Thus, as shown in FIG. 3, the report 302 indicates that the machine 100 was operational for a total of 14 hours in a day. The report 302 further illustrates a graph indicative of a first total percentage time 304 (as 69.5%) of the total time of operation when the machine 100 was detected to be performing travelling operation. Similarly, the graph indicates a second percentage time 306 (as 1.9%) of the total time of operation when the machine 100 was detected to be performing the loading operations. Similarly, the graph also includes a third percentage time 308 (as 6.4%) of the total time of operation when the machine 100 was detected to be performing the dumping operations. Additionally, the graph also includes a fourth percentage time 310 (as 22.2%) of the total time of operation where the machine 100 was not working or was stopped.

Although the report 302 is show and described to include a pie graph, it may be contemplated that the type of graph is merely exemplary and that any other graph or way of presenting such information may be used to achieve similar results without deviating from the scope of the claimed subject matter.

INDUSTRIAL APPLICABILITY

The system 200 of the present disclosure is a retrofittable telematics device that can be fitted onto the machine 100 without requiring additional installation of any payload sensors on the dump body 118. The system 200 utilizes the accelerometer 202, the position sensor 204 (i.e., the GPS sensor) and the engine speed received from the engine ECM 212 to determine the machine operations. The system 200 provides a safe, accurate and inexpensive alternative to the externally installed payload sensors traditionally mounted on the dump body 118. Additionally, by continuously learning and adapting using machine learning, the system 200 enhances the accuracy of the determination of machine operations. As the system 200 is a retrofittable system, it can be fitted on to any model of the machine 100, whether new or old.

Additionally, a GPS position sensor almost always has a signal lag, making the detection of machine movement inaccurate and prone to errors. Thus, by tracking travelling operations using only the accelerometer 202 instead of relying on the GPS sensor, the system 200 also provides an efficient and accurate way of monitoring travelling operations, specifically in scenarios where GPS signal may not always be available, such as in underground mining operations. Further, the machine operations report, such as the report 302 generated and displayed by the system 200 facilitates an operator of the machine 100 and the entire operation at the worksite 102, to better monitor the machine 100 performance at the worksite 102.

Figure 4A:
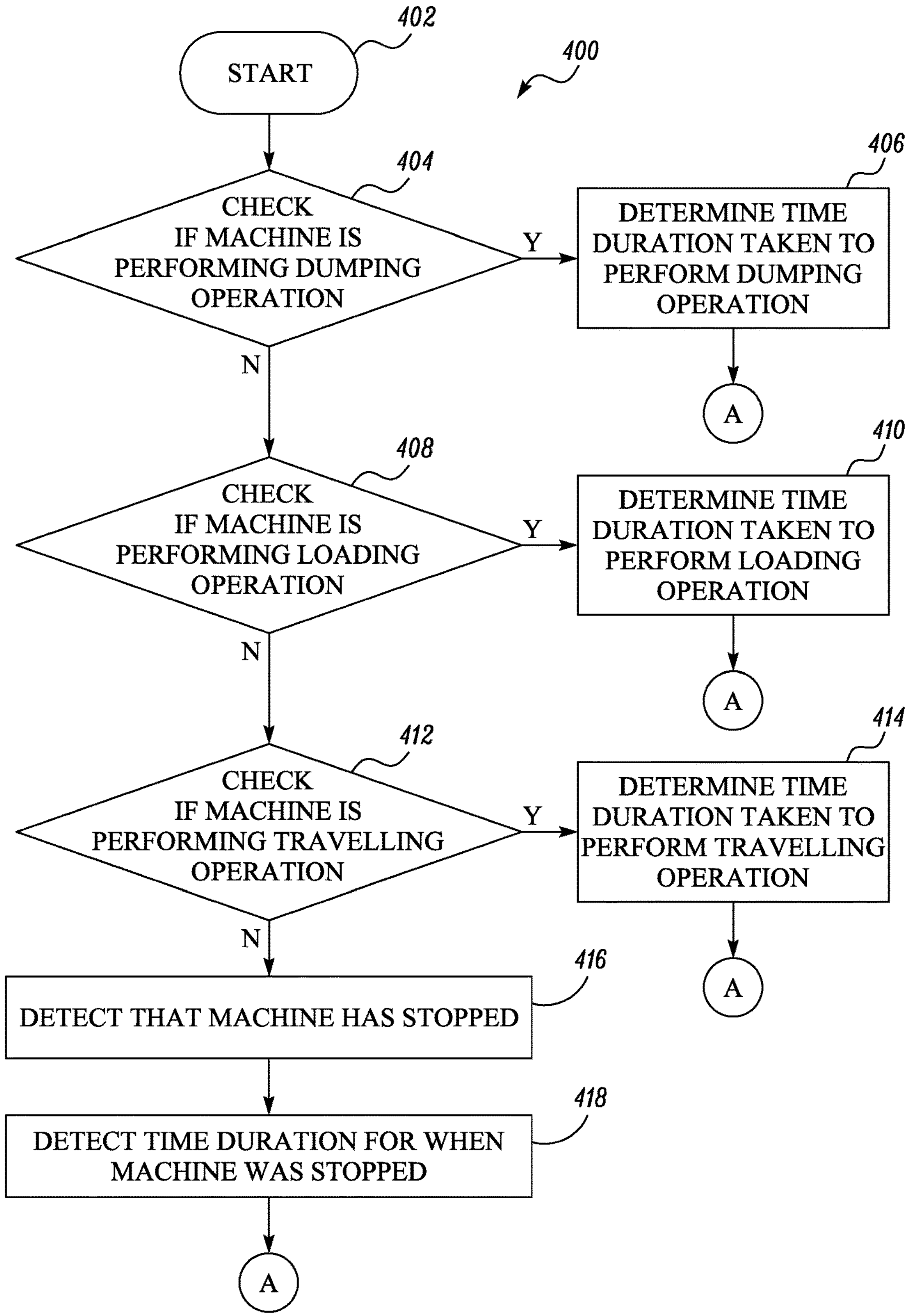
FIG. 4A illustrates a first part of an exemplary method for monitoring operations of the machine at the worksite, according to the embodiments of the present disclosure.
Figure 4B:
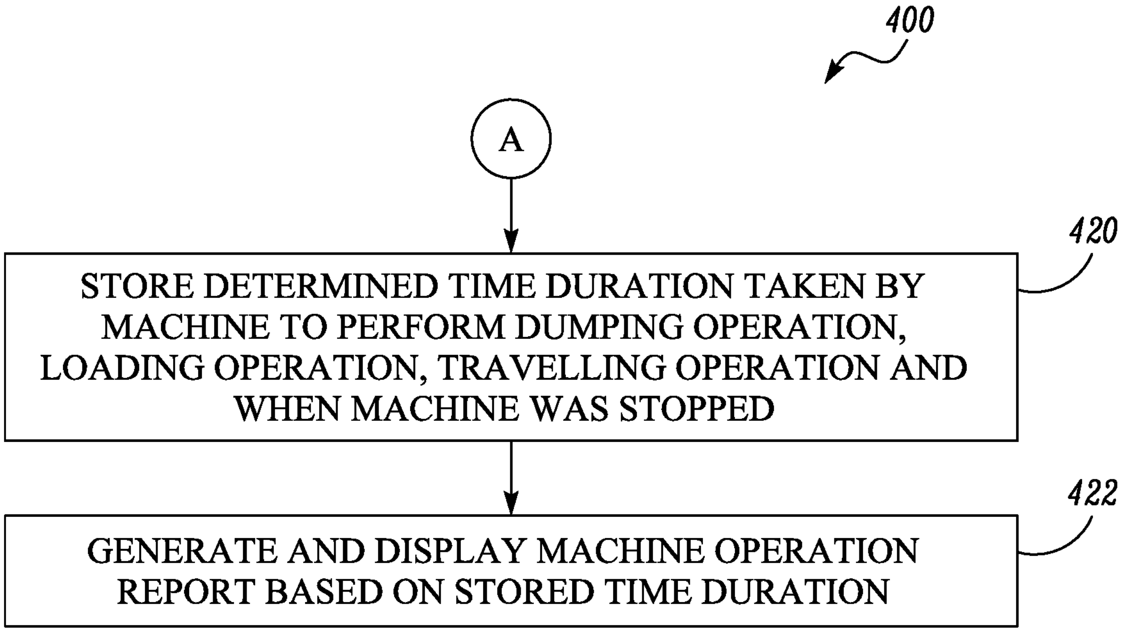
FIG. 4B illustrates a second part of the exemplary method for monitoring operations of the machine at the worksite, according to the embodiments of the present disclosure

FIGS. 4A-4B illustrate an exemplary method 400 for monitoring the operations of the machine 100, as the machine 100 repeatedly performs loading, dumping and travelling operations at the worksite 102.

The method begins at step 402 where the system 200 is installed to be operatively connected to the engine ECM 212 of the machine 100. In operation, the processing unit 210 of the system 200, is configured first check if the machine 100 is performing the dumping operation, at step 404. In an exemplary embodiment, the processing unit 210 is configured use the first parameter P1 indicative of the engine speed and the third parameter P3 indicative of the machine speed, in order to determine if the machine 100 is performing the dumping operation. If the machine 100 is detected to be performing the dumping operation (i.e., the 'yes' branch), then the method proceeds to step 406. At step 406, the processing unit 210 determines the time duration taken $TT_1$ by the machine 100 to perform the dumping operation. The determined time taken $TT_1$ is then stored in the memory 206 or an external database (not shown), at step 420. However, if at step 404, if the machine 100 is detected to be not performing the dumping operation (i.e., the 'No' branch), then the method proceeds to step 408.

At step 408, the processing unit 210 checks if the machine 100 is performing the loading operation. In an exemplary embodiment, the processing unit 210 use the first parameter P1 indicative of the engine speed and the second parameter P2 indicative of the vibrations detected inside the operator cabin 108 by the accelerometer 202, in order to determine if the machine 100 is performing the loading operation. If the machine 100 is detected to be performing the loading operation (i.e., the 'yes' branch), then the method proceeds to step 410. At step 410, the processing unit 210 determines the time duration taken $TT_2$ by the machine 100 to perform the loading operation. The determined time taken $TT_2$ is then stored in the memory 206 or an external database (not shown), at step 420. However, if at step 408, if the machine 100 is detected to be not performing the loading operation (i.e., the 'No' branch), then the method proceeds to step 412.

At step 412, the processing unit 210 checks if the machine 100 is performing the travelling operation. In an exemplary embodiment, the processing unit 210 uses the second parameter P2 indicative of the vibrations detected inside the operator cabin 108 by the accelerometer 202, in order to determine if the machine 100 is performing the travelling operation. If the machine 100 is detected to be performing the travelling operation (i.e., the 'yes' branch), then the method proceeds to step 414. At step 414, the processing unit 210 determines the time duration taken $TT_3$ by the machine 100 to perform the travelling operation. The determined time taken $TT_3$ is then stored in the memory 206 or an external database (not shown), at step 420. However, if at step 412, if the machine 100 is detected to be not performing the travelling operation (i.e., the 'No' branch), then the processing unit 210 detects that the machine 100 was non-operational or stopped, at step 416.

Further, at step 418, the processing unit 210 determines the time duration taken $TT_4$ when the machine 100 was stopped. The determined time taken $TT_4$ is then stored in the memory 206 or an external database (not shown), at step 420. Furthermore, in an embodiment of the present disclosure, at step 422, the processing unit 210 generates and displays a machine operation report 302 based on the stored time durations. The machine operations report 302 indicates what percentage of time (in a total time of operation of the machine 100) was spent on performing the travelling operations, the dumping operations, the loading operations and when the machine 100 was stopped and was non-operational.

Although the method 400 describes a particular sequence in which the checks are performed by the system 200 (first check for dumping operation, then for loading followed by check for travelling), it may be contemplated that such sequence is merely exemplary and may be varied to achieve similar results.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method for monitoring operations of a machine operating at a worksite, the machine being powered by an engine and including an implement for performing one or more of a loading operation and a dumping operation, the method comprising:

determining, by a processing unit using an engine speed sensor associated with the engine, a first parameter corresponding to an engine speed associated with the engine;

determining, by the processing unit using an accelerometer positioned inside an operator cabin of the machine, a second parameter indicative of vibrations detected inside the operator cabin;

determining, by the processing unit using a position sensor, a third parameter indicative of a machine speed associated with the machine; and determining, by the processing unit, a machine operation as one of the loading operation, the dumping operation, and a travelling operation based on one or more of the determined first parameter, the determined second parameter, and the determined third parameter, wherein the machine is configured to operate for a predefined time duration at the worksite to perform a plurality of loading operations, a plurality of dumping operations, and a plurality of travelling operations within the predefined time duration, and wherein the method further comprises:

determining, by the processing unit, a time duration associated with completion of at least two of the plurality of loading operations, the plurality of dumping operations, and the plurality of travelling operations; and generating, by the processing unit, a machine operations report indicating at least two of:

a first total percentage time of the predefined time duration, spent by the machine in performing the plurality of loading operations;

a second total percentage time of the predefined time duration, spent by the machine in performing the plurality of dumping operations; and a third total percentage time of the predefined time duration spent by the machine in performing the plurality of travelling operations.

2. The method of claim 1, wherein determining the first parameter comprises:

detecting, by the processing unit, an idling state associated with the engine based on one or more engine parameters; and receiving, by the processing unit, a set of engine idling speed values for a first predefined time duration, when the engine is detected to be operating in the idling state, and wherein the dumping operation is determined based on the first parameter and the third parameter when:

each of received engine idling speed value within the set of engine idling speed values is greater than or equal to a first threshold value; and the determined third parameter, indicating the machine speed, is less than or equal to a third threshold.

3. The method of claim 2, wherein determining the first parameter further comprises determining, by the processing unit, a standard deviation associated with the received set of engine idling speed values, the standard deviation being determined as the first parameter, and wherein the method further comprises determining, by the processing unit, the machine operation as the dumping operation when:

the determined standard deviation is less than or equal to a second threshold.

4. The method of claim 1, wherein the accelerometer is configured to detect one or more magnitude values of acceleration vector applied to the operator cabin along X-axis, Y-axis, and Z-axis, and wherein determining the second parameter further comprises:

receiving, by the processing unit, a set of magnitude values of acceleration vector for each of the X-axis, the Y-axis, and the Z-axis for a second predefined time duration; and determining, by the processing unit, a statistical range associated with the received set of magnitude values of acceleration vector for each of the X-axis, the Y-axis, and the Z-axis, the statistical range being determined as the second parameter.

5. The method of claim 4, wherein the loading operation is determined based on the first parameter and the second parameter, and wherein method further comprises determining, by the processing unit, the machine operation as the loading operation when:

the determined first parameter indicative of the engine speed is less than or equal to a fourth threshold value; and the determined second parameter, including the statistical range associated with the set of magnitude data of accelerometer vector for at least one of the X-axis, the Y-axis, and the Z-axis, is greater than a fourth threshold value.

6. The method of claim 1, wherein the accelerometer is configured to detect one or more magnitude values of acceleration vector applied to the operator cabin along X-axis, Y-axis, and Z-axis, wherein determining the second parameter further comprises:

receiving, by the processing unit, a plurality of sets of magnitude values of acceleration vector for each of the X-axis, the Y-axis, and the Z-axis for a fourth predefined time duration, each set of the plurality of sets including one or more subsets of magnitude values received for a fifth predefined time duration, the fifth predefined time duration being less than the fourth predefined time duration;

determining, by the processing unit, a median absolute deviation for each of the one or more subsets of magnitude values of acceleration vector for each of the X-axis, the Y-axis, and the Z-axis;

determining, by the processing unit, a fourth parameter indicative of a sum of one or more of the median absolute deviations corresponding to the plurality of subsets of magnitude values of acceleration vector for each of the X-axis, the Y-axis, and the Z-axis;

determining, by the processing unit, a mean absolute deviation for each of the one or more subsets of magnitude values of acceleration vector for each of the X-axis, the Y-axis, and the Z-axis;

determining, by the processing unit, a fifth parameter indicative of a sum of one or more of the mean absolute deviations corresponding to the plurality of subsets of magnitude values of acceleration vector for each of the X-axis, the Y-axis, and the Z-axis;

determining, by the processing unit, a standard deviation for each of the one or more subsets of magnitude values of acceleration vector for each of the X-axis, the Y-axis, and the Z-axis; and determining, by the processing unit, a sixth parameter indicative of a sum of one or more of the standard deviations corresponding to the plurality of subsets of magnitude values of acceleration vector for each of the X-axis, the Y-axis, and the Z-axis, and wherein the second parameter includes the fourth parameter, the fifth parameter, and the sixth parameter.

7. The method of claim 6, wherein the travelling operation is determined based on the second parameter including the fourth parameter, the fifth parameter, and the sixth parameter, and wherein the method further comprises determining, by the processing unit, the machine operation as the travelling operation when:

the fourth parameter, for at least one of the X-axis, Y-axis, and the Z-axis, is greater than a seventh threshold value;

the fifth parameter, for at least one of the X-axis, Y-axis, and the Z-axis, is greater than an eighth threshold value; and the sixth parameter, for at least one of the X-axis, Y-axis, and the Z-axis, is greater than a ninth threshold value.

8. The method of claim 1, further comprising:

obtaining, by the processing unit, a plurality of first parameters, a plurality of second parameters, and a plurality of third parameters;

learning, by the processing unit, by relating the determined machine operations with the first parameter, the second parameter, and the third parameter; and determining, by the processing unit, one or more threshold values for determining the machine operations based on the first parameter, the second parameter, and the third parameter based on the learning.

9. The method of claim 1, wherein the method further comprises:

determining, by the processing unit, a time duration associated with completion of each of the plurality of loading operations, the plurality of dumping operations, and the plurality of travelling operations; and generating, by the processing unit, a machine operations report indicating each of:

the first total percentage time of the predefined time duration, spent by the machine in performing the plurality of loading operations;

the second total percentage time of the predefined time duration, spent by the machine in performing the plurality of dumping operations; and the third total percentage time of the predefined time duration spent by the machine in performing the plurality of travelling operations.

10. A system for monitoring operations of a machine operating at a worksite, the machine being powered by an engine and including an implement for performing one or more of a loading operation and a dumping operation, the system comprising:

an accelerometer configured to detect vibrations inside an operator cabin of the machine;

a machine speed sensor configured to detect machine speed associated with the machine; and a processing unit communicatively coupled to the accelerometer, the machine speed sensor and an engine speed sensor associated with the engine, the processing unit being configured to:

determine, using the engine speed sensor, a first parameter corresponding to an engine speed associated with the engine;

determine, using the accelerometer, a second parameter indicative of vibrations detected inside the operator cabin;

determine, using the machine speed sensor, a third parameter indicative of machine speed associated with the machine; and determine a machine operation as one of the loading operation, the dumping operation, and a travelling operation based on one or more of the determined first parameter, the determined second parameter, and the determined third parameter, wherein the machine is configured to operate for a predefined time duration at the worksite to perform a plurality of loading operations, a plurality of dumping operations, and a plurality of travelling operations within the predefined time duration, and wherein the processing unit is further configured to:

determine a time duration associated with completion of at least two of the plurality of loading operations, the plurality of dumping operations, and the plurality of travelling operations; and generate a machine operations report indicating at least two of:

a first total percentage time of the predefined time duration, spent by the machine in performing the plurality of loading operations;

a second total percentage time of the predefined time duration, spent by the machine in performing the plurality of dumping operations; and a third total percentage time of the predefined time duration spent by the machine in performing the plurality of travelling operations.

11. The system of claim 10, wherein the system is a retrofittable system configured to be retrofitted to the machine.

12. The system of claim 10, wherein the processing unit is configured to:

detect an idling state associated with the engine based on one or more engine parameters; and receive a set of engine idling speed values for a first predefined time duration, when the engine is detected to be operating in the idling state, and wherein the dumping operation is determined based on the first parameter and the third parameter when:

each of received engine idling speed value within the set of engine idling speed values is greater than or equal to a first threshold value; and the determined third parameter, indicating the machine speed, is less than or equal to a third threshold.

13. The system of claim 12, wherein the processing unit is configured to determine a standard deviation associated with the received set of engine idling speed values, the standard deviation being determined as the first parameter, and wherein the processing unit is configured to determine the machine operation as the dumping operation when:

the determined standard deviation is less than or equal to a second threshold.

14. The system of claim 10, wherein the accelerometer is configured to detect one or more magnitude values of acceleration vector applied to the operator cabin along X-axis, Y-axis, and Z-axis, and wherein the processing unit is configured to:

receive a set of magnitude values of acceleration vector for each of the X-axis, the Y-axis, and the Z-axis for a second predefined time duration; and determine a statistical range associated with the received set of magnitude values of acceleration vector for each of the X-axis, the Y-axis, and the Z-axis, the statistical range being determined as the second parameter.

15. The system of claim 14, wherein the loading operation is determined based on the first parameter, the second parameter, and the third parameter, and wherein the processing unit is configured to determine the machine operation as the loading operation when:

the determined first parameter indicative of the engine speed is less than or equal to a fourth threshold value;

the determined second parameter, including the statistical range associated with the set of magnitude data of accelerometer vector for at least one of the X-axis, the Y-axis, and the Z-axis, lies within a predefined range; and the determined third parameter indicating the machine speed is less than or equal to a third threshold.

16. The system of claim 10, wherein the accelerometer is configured to detect one or more magnitude values of acceleration vector applied to the operator cabin along X-axis, Y-axis, and Z-axis, wherein the processing unit is configured to:

receive a plurality of sets of magnitude values of acceleration vector for each of the X-axis, the Y-axis, and the Z-axis for a fourth predefined time duration, each set of the plurality of sets including one or more subsets of sample data received for a fifth predefined time duration, the fifth predefined time duration being less than the fourth predefined time duration;

determine a median absolute deviation for each of the one or more subsets of magnitude values of acceleration vector for each of the X-axis, the Y-axis, and the Z-axis;

determine a fourth parameter indicative of a sum of one or more of the median absolute deviations corresponding to the plurality of subsets of magnitude values of acceleration vector for each of the X-axis, the Y-axis, and the Z-axis;

determine a mean absolute deviation for each of the one or more of subsets of magnitude values of acceleration vector for each of the X-axis, the Y-axis, and the Z-axis;

determine a fifth parameter indicative of a sum of one or more of the mean absolute deviation corresponding to the plurality of subsets sets of magnitude values of acceleration vector for each of the X-axis, the Y-axis, and the Z-axis;

determine a standard deviation for each of the one or more of sets of magnitude values of acceleration vector for each of the X-axis, the Y-axis, and the Z-axis; and determine a sixth parameter indicative of a sum of the one or more of standard deviations corresponding to the one or more of the subsets of magnitude values of acceleration vector for each of the X-axis, the Y-axis and the Z-axis, and wherein the second parameter includes the fourth parameter, the fifth parameter, and the sixth parameter.

17. The system of claim 16, wherein the travelling operation is determined based on the second parameter including the fourth parameter, the fifth parameter, and the sixth parameter, and wherein the processing unit is configured to determine the machine operation as the travelling operation when:

the fourth parameter, for at least one of the X-axis, Y-axis, and the Z-axis, is greater than a seventh threshold value;

the fifth parameter, for at least one of the X-axis, Y-axis, and the Z-axis, is greater than an eighth threshold value; and the sixth parameter, for at least one of the X-axis, Y-axis, and the Z-axis, is greater than a ninth threshold value.

18. The system of claim 10, wherein the processing unit further comprising:

an observation unit configured to obtain a plurality of first parameter, a plurality of second parameter, and a plurality of third parameter;

a learning unit configured to learn by relating the determined machine operations with the first parameter, the second parameter, and the third parameter; and a decision unit configured to determine one or more threshold values for determining the machine operations based on the first parameter, the second parameter, and the third parameter based on the learning.

19. The system of claim 10, wherein the processing unit is further configured to:

determine a time duration associated with completion of each of the plurality of loading operations, the plurality of dumping operations, and the plurality of travelling operations; and generate a machine operations report indicating each of:

the first total percentage time of the predefined time duration, spent by the machine in performing the plurality of loading operations;

the second total percentage time of the predefined time duration, spent by the machine in performing the plurality of dumping operations; and a third total percentage time of the predefined time duration spent by the machine in performing the plurality of travelling operations.

20. A machine configured to operate at a worksite, the machine comprising:

a machine frame;

an operator cabin supported on the machine frame, the operator cabin including one or more controls for operating the machine;

an implement coupled to the machine frame and configured to perform one or more of a loading operation and a dumping operation;

an engine for powering the machine, the implement and the one or more controls;

an engine speed sensor associated with the engine and configured to detect an engine speed during operations of the machine;

a system for monitoring operations of the machine at the worksite, the system comprising:

an accelerometer configured to detect vibrations inside the operator cabin;

a position sensor configured to detect machine speed associated with the machine; and a processing unit communicatively coupled to the accelerometer, the position sensor and the engine speed sensor, the processing unit being configured to:

determine a first parameter corresponding to the engine speed associated with the engine;

determine a second parameter indicative of vibrations detected inside the operator cabin;

determine a third parameter indicative of machine speed associated with the machine; and determine the machine operation as one of the loading operation, the dumping operation and a travelling operation based on one or more of the determined first parameter, the determined second parameter, and the determined third parameter, wherein the machine is configured to operate for a predefined time duration at the worksite to perform a plurality of loading operations, a plurality of dumping operations, and a plurality of travelling operations within the predefined time duration, and wherein the processing unit is further configured to:

determine a time duration associated with completion of at least two of the plurality of loading operations, the plurality of dumping operations, and the plurality of travelling operations; and generate a machine operations report indicating at least two of:

a first total percentage time of the predefined time duration, spent by the machine in performing the plurality of loading operations;

a second total percentage time of the predefined time duration, spent by the machine in performing the plurality of dumping operations; and a third total percentage time of the predefined time duration spent by the machine in performing the plurality of travelling operations.

* * * * *